United States Patent
Zhang

(10) Patent No.: US 8,898,924 B2
(45) Date of Patent: Dec. 2, 2014

(54) TEST DEVICE FOR TESTING DEPTH OF CHAMFER

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 176 days.

(21) Appl. No.: 13/593,538

(22) Filed: Aug. 24, 2012

(65) Prior Publication Data

US 2014/0041246 A1 Feb. 13, 2014

(30) Foreign Application Priority Data

Aug. 10, 2012 (CN) .......................... 2012 1 0283899

(51) Int. Cl.
*G01B 5/18* (2006.01)
*G01B 3/22* (2006.01)

(52) U.S. Cl.
CPC ... *G01B 5/18* (2013.01); *G01B 3/22* (2013.01)
USPC .............................................. 33/836; 33/542

(58) Field of Classification Search
CPC .......... G01B 5/061; G01B 3/22; G01B 3/008; G01B 5/0004; G01B 7/002; G01B 3/28; G01B 5/18; G01B 7/26
USPC .......................................... 33/832, 836, 542
See application file for complete search history.

(56) References Cited

U.S. PATENT DOCUMENTS

| | | | | |
|---|---|---|---|---|
| 2,758,383 A | * | 8/1956 | Breit | 33/544.6 |
| 2,959,864 A | * | 11/1960 | Webb et al. | 33/833 |
| 4,530,158 A | * | 7/1985 | Chauquet | 33/556 |
| 5,410,818 A | * | 5/1995 | Chalk | 33/833 |
| 8,336,225 B1 | * | 12/2012 | Zhang | 33/836 |
| 8,388,277 B2 | * | 3/2013 | Gray et al. | 408/1 R |
| 2007/0294907 A1 | * | 12/2007 | Lupu | 33/833 |
| 2009/0279970 A1 | * | 11/2009 | Gray | 408/194 |
| 2012/0304477 A1 | * | 12/2012 | Zhang | 33/701 |
| 2014/0041246 A1 | * | 2/2014 | Zhang | 33/836 |

* cited by examiner

*Primary Examiner* — Yaritza Guadalupe-McCall
(74) *Attorney, Agent, or Firm* — Novak Druce Connolly Bove + Quigg LLP

(57) ABSTRACT

A test device includes a base rested on an object, an inserting member slidably mounted to the base and contacts a slanted surface of a chamfer of the object, and a test member slidably rested on the base. The base includes a positioning bar abutting a bottom end of the chamfer. A first cutout and a second cutout communicating with the first cutout and positioned in front of the first cutout are defined in a bottom surface of the testing member. A depth of the second cutout equals the tolerance of a standard depth of the chamfer. If a top surface of the inserting member can be received in the second cutout, the depth of the chamfer is qualified. If the top surface of the inserting member cannot be received in the second cutout, the depth of the chamfer is unqualified.

5 Claims, 5 Drawing Sheets

TEST DEVICE FOR TESTING DEPTH OF CHAMFER

BACKGROUND

1. Technical Field

The present disclosure relates to a device for testing a depth of a chamfer.

2. Description of Related Art

The depth of a chamfer is generally tested by calipers or projective measurements. However, the calipers will be imprecise because a caliper cannot be exactly positioned on a slanted surface of the chamfer, and the projective measurements will be difficult to maneuver in case of a small space.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
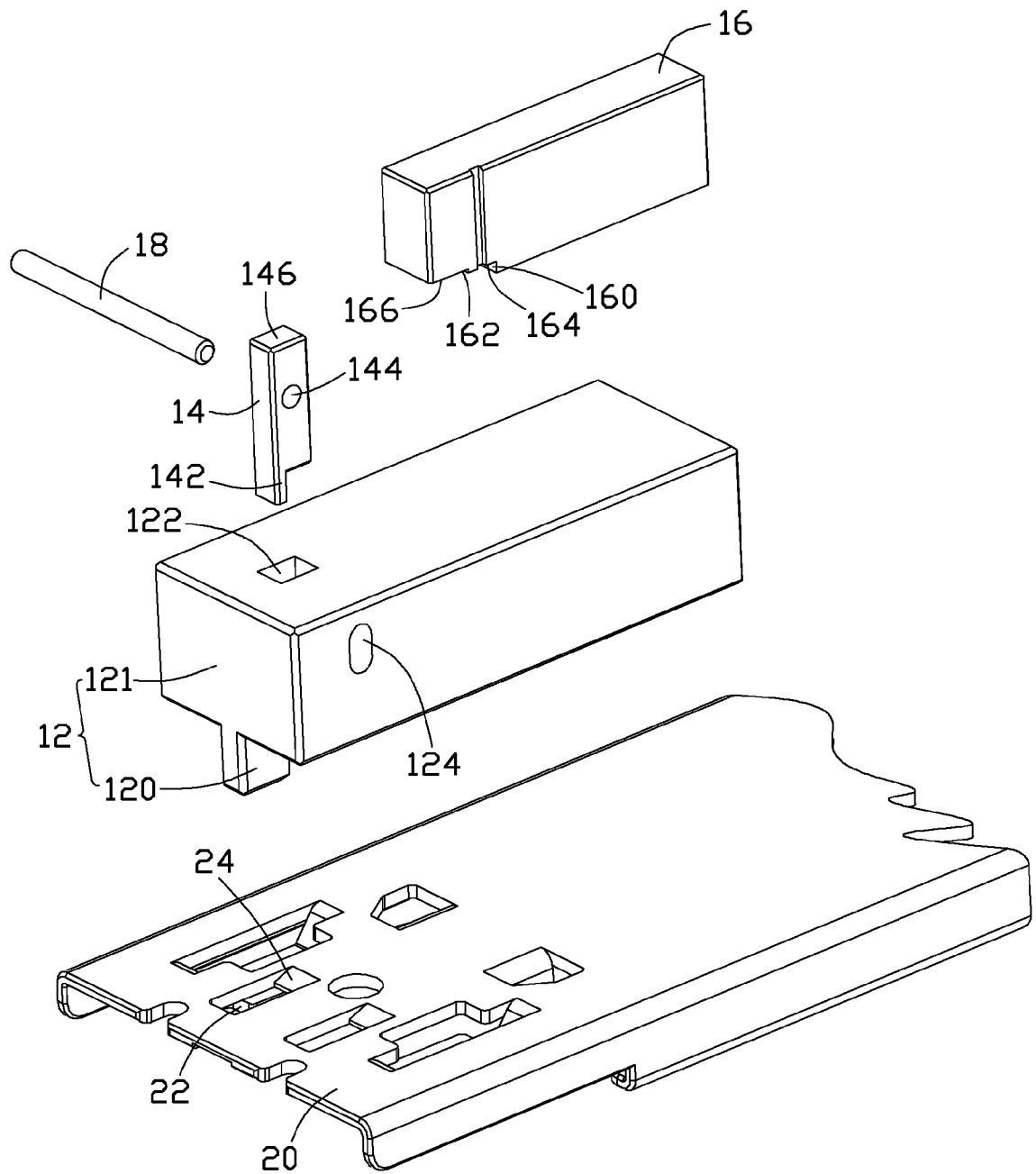
FIG. 1 is an exploded, isometric view of an exemplary embodiment of a test device, together with an object to be tested.

Referring to FIG. 1, an exemplary embodiment of a test device is provided. The test device is for testing whether a depth of a chamfer 24 of a through hole 22 of an object 20 is qualified or not. The test device includes a base 12, a rectangular inserting member 14, a rectangular test member 16, and a pole 18.

The base 12 includes a rectangular block 121 and a rectangular positioning bar 120 perpendicularly extending down from a front end of a bottom of the block 121. The block 121 defines a rectangular receiving hole 122 extending through a top and a bottom of the block 121 and adjacent to a rear surface of the positioning bar 120, and a slide slot 124 extending through opposite sides of the block 121. The slide slot 124 is perpendicular to and communicates with the receiving hole 120. A front sidewall bounding the receiving hole 122 is coplanar with the rear surface of the positioning bar 120.

A rectangular extension bar 142 perpendicularly extends down from a front end of a bottom of the inserting member 14. The inserting member 14 defines a fixing hole 144 extending through opposite sides of the inserting member 14.

A rectangular first cutout 160 is defined in a bottom of the test member 16 and extends through a front end and opposite sides of the test member 16. A rectangular second cutout 162 is defined in a front portion of a top wall 164 bounding the first cutout 160 and extends through the front end and the opposite sides of the test member 16. The depth H of the second cutout 162 is set to equal to the tolerance of a standard depth of the chamfer 24.

Figure 2:
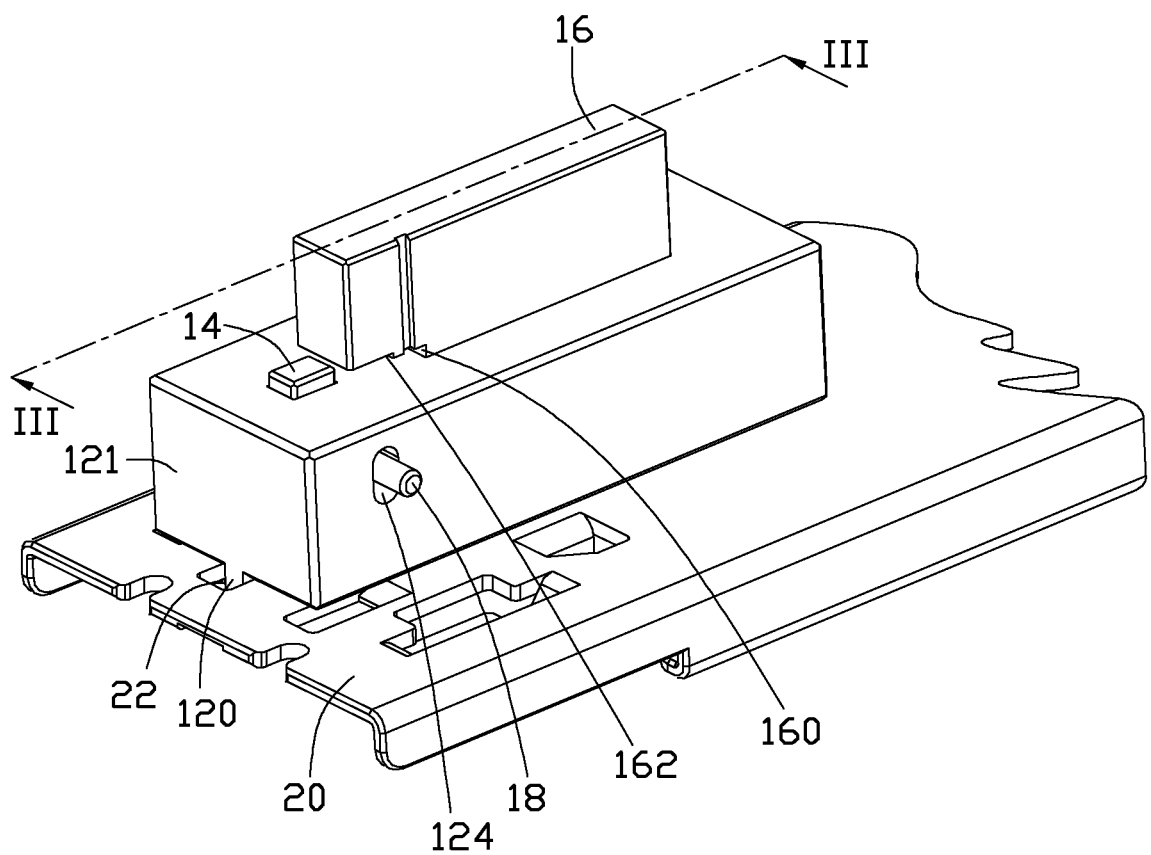
FIG. 2 is an assembled, isometric view of the test device and the object of FIG. 1.

Referring to FIG. 2, in assembly, the inserting member 14 is inserted into the receiving hole 122. The pole 18 is extended through the slide slot 124 and the fixing hole 144. The pole 18 is capable of sliding upward or downward in the slide slot 124, but stays tightly engaged in the fixing hole 144, thus, the inserting member 14 is slidably mounted to the base 12 in a direction parallel to extension direction of the positioning bar 120. The extension bar 142 extends out of the receiving hole 122 and abuts the rear surface of the positioning bar 120. The test member 16 is positioned on the top of the block 121 behind the inserting member 14, with the first and second cutouts 160 and 162 facing the inserting member 14.

Figure 3:
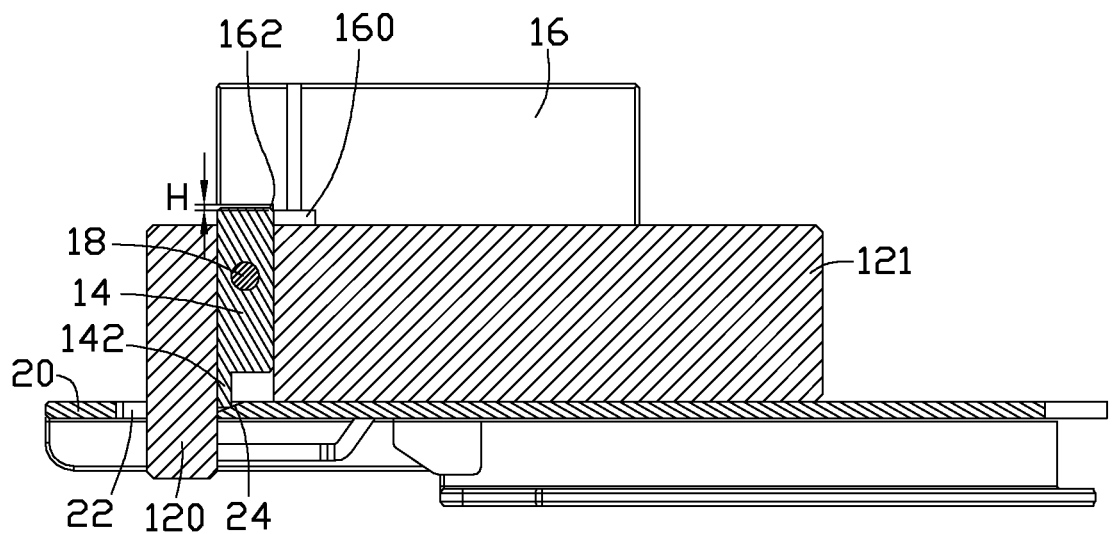
FIGS. 3 to 5 are cross-sectional views of FIG. 2, taking along the line III-III, but showing different using states.
Figure 4:
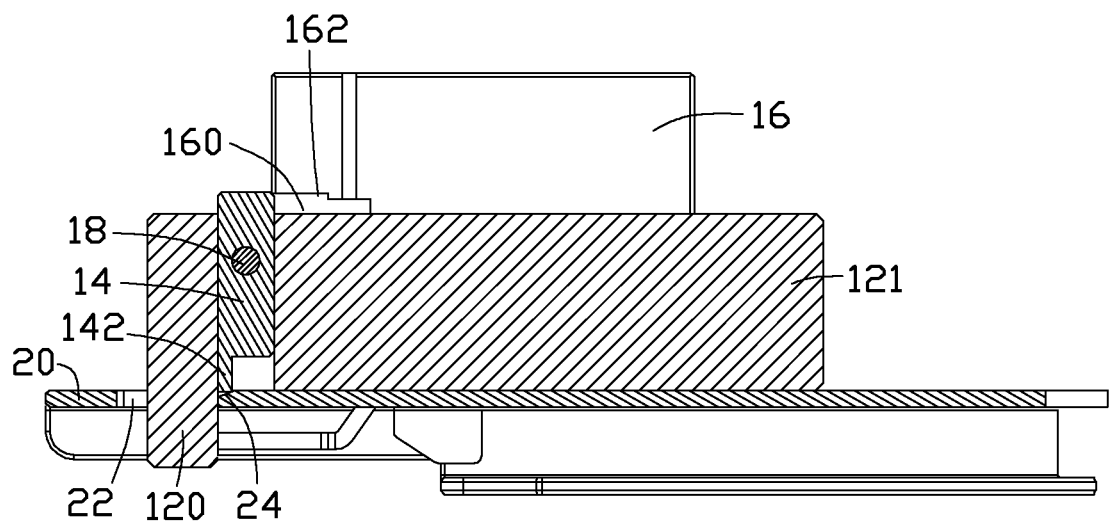
Figure 5:
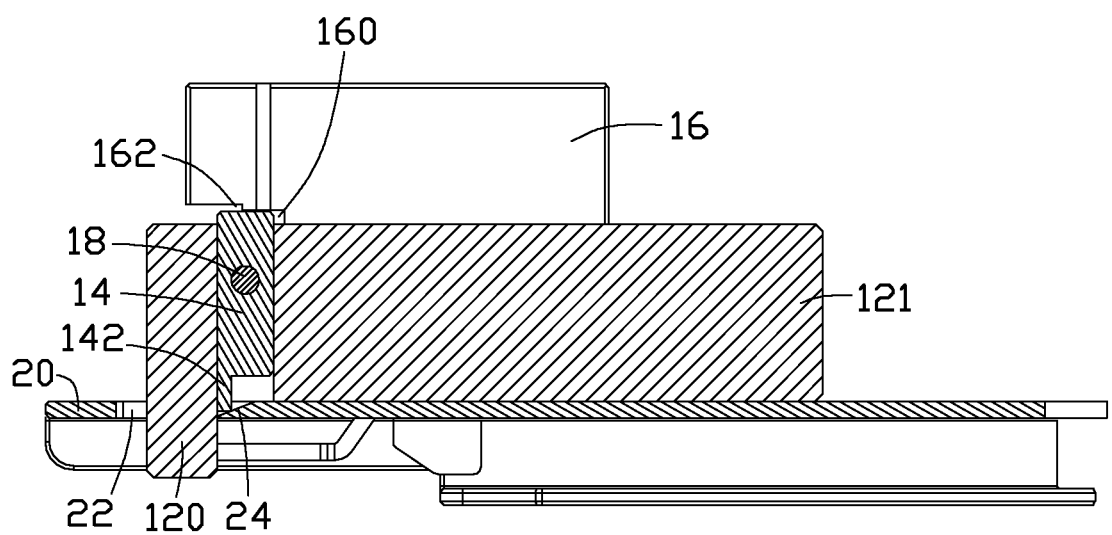

Referring to FIGS. 3 to 5, in use, the block 121 is rested on the object 20. The positioning bar 120 is inserted into the through hole 22 and abuts a bottom end of the chamfer 24. A bottom end of the extension bar 142 contacts a slanted surface of the chamfer 24.

If the depth of the chamfer 24 equals a minimum standard depth, a top surface 146 of the inserting member 14 is coplanar with a top wall 166 bounding the second cutout 162. If the depth of the chamfer 24 equals a maximal standard depth, the top surface 146 of the inserting member 14 is coplanar with the top wall 164 of the first cutout 160.

In test, the test member 16 is slid toward the inserting member 14. If the top surface of the inserting member 14 is received in the second cutout 162, the depth of the chamfer 24 is qualified. If the top surface of the inserting member 14 cannot be received in the second cutout 162, the depth of the chamfer 24 is unqualified. Particularly, if the top surface of the inserting member 14 is received in the first cutout 160, the depth of the chamfer 24 is greater than the maximal standard depth; if the top of the inserting member 14 abuts the front end surface of the test member 16, the depth of the chamfer 24 is less than the minimum standard depth.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A test device for testing whether a depth of a chamfer of a hole of an object is qualified or not, the test device comprising:

a base comprising a block to be rested on the object and a positioning bar extending down from the block to abut a bottom end of the chamfer;

an inserting member slidably mounted to the block along a direction parallel to an extension direction of the positioning bar, wherein a bottom end of the inserting member is operable to contact a slanted surface of the chamfer; and a test member slidably rested on the block, a bottom of the test member defining a first cutout extending through a front end surface of the test member, a front portion of a top wall bounding the first cutout defining a second cutout communicating with the first cutout and extending through the front end surface of the test member, wherein a depth of the second cutout equals a tolerance of the standard depth of the chamfer of the object, wherein the second cutout is operable of receiving an upper portion of the inserting member in response to the depth of the chamfer of the hole being qualified, the first cutout is operable of receiving the upper portion of the inserting member in response to the depth of the chamfer of the hole being greater than the maximal standard depth of the chamfer.

2. The test device of claim 1, further comprising a pole, wherein the block defines a receiving hole extending through a top and a bottom of the block to receive the inserting member, and a slide slot extending through opposite sides of the block and communicating with the receiving hole, the pole is fixed to the inserting member and slidable in the slide slot in a direction parallel to the extension direction of the positioning bar.

3. The test device of claim 2, wherein the positioning bar is rectangular, and the inserting member extends out of the receiving hole and abuts a rear surface of the positioning bar.

4. The test device of claim 1, wherein an extension bar extends down from a front end of a bottom of the inserting member to contact the slanted surface of the chamfer.

5. The test device of claim 4, wherein a front surface of the extension bar abuts a rear surface of the positioning bar.

* * * * *